(No Model.)
D. BOTHWELL.
LIQUID MEASURE.
No. 405,075. Patented June 11, 1889.
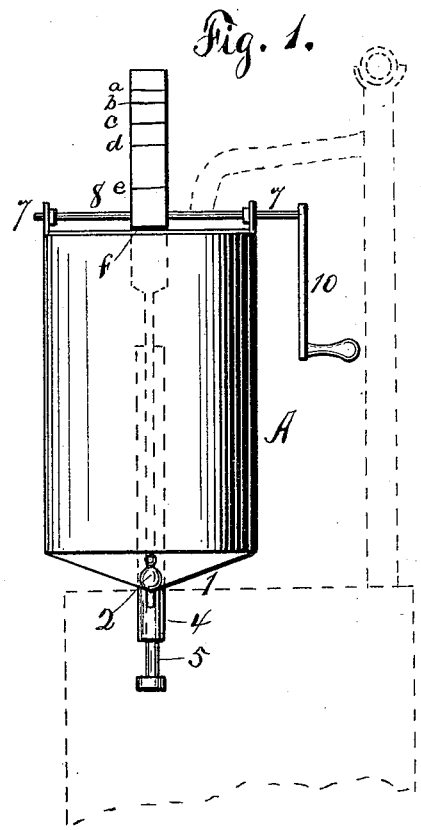
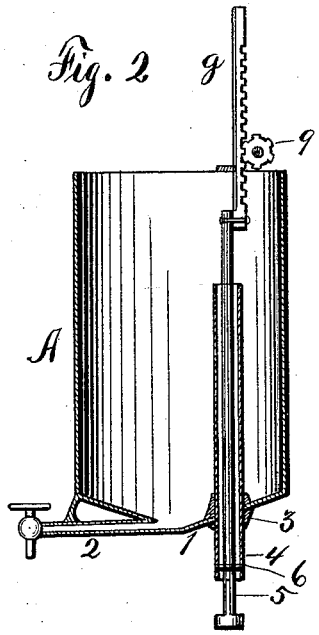
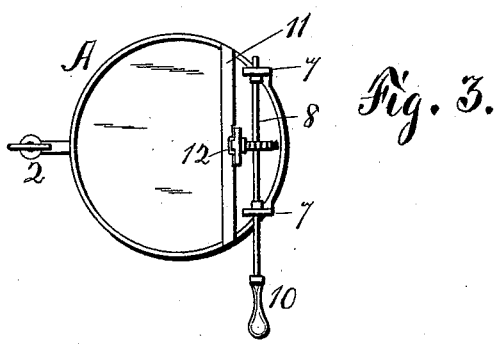
Witnesses
H. P. Denison
John S. Bramby
David Bothwell Inventor
By his Attorneys
Smith & Denison

UNITED STATES PATENT OFFICE.

DAVID BOTHWELL, OF HANNIBAL, NEW YORK.

LIQUID-MEASURE.

SPECIFICATION forming part of Letters Patent No. 405,075, dated June 11, 1889.

Application filed February 20, 1889. Serial No. 300,582. (No model.)

*To all whom it may concern:*

Be it known that I, DAVID BOTHWELL, of Hannibal, county of Oswego, in the State of New York, a citizen of the United States, have invented certain new and useful Improvements in Measures for Liquids, of which the following is a specification, reference being had to the accompanying drawings, in which—

Figure 1 is a side elevation showing also in dotted lines a pump and tank. Fig. 2 is a vertical sectional elevation of the measure. Fig. 3 is a top plan view.

My invention relates to liquid-measurers which are adjustable, so that the measure can be set so as to hold only a quart, and can be changed so it will hold two quarts or two gallons, as may be desired.

The object of my invention is to provide a simple adjustable measure, dispensing with the ordinary separate measures and combining in one implement a range of measuring capacity ranging from, say, one quart or a pint to two or three or five gallons, as may be desired.

My invention consists in the several novel features of construction and operation hereinafter described, and which are set forth in the claims annexed. It is constructed as follows:

A is the body of the measure, of cylindrical form, provided with a convex bottom 1, from the apex of which the discharge pipe and faucet 2 extends out beyond the body. Through the convex bottom I insert the stuffing-box 3, and in the stuffing-box I place the tube 4, open at both ends, and within the tube 4, I insert the elevating-rod 5, the rod and tube being secured together by the rivet 6. Upon the top of the rod 5, above the tube, I secure the rack $g$, which consists of a bar of metal having on one side the rack, and the other side being plane, and provided with graduations—as, for instance, the mark $a$ indicating a pint; $b$, a quart; $c$, three pints; $d$, two quarts; $e$, three quarts, and $f$ a gallon. Of course these graduations can be varied as may be desired. Upon the top of the can or body I place the ears 7, and in them I mount the shaft 8, provided with a pinion 9, engaging with the rack $g$, and 10 is a crank-handle upon the shaft; also, across the top of the can I place the strap 11, provided with a groove 12, which groove operates to guide the rack vertically when the shaft 8 is rotated.

It is operated as follows: As shown in the drawings, the measure is set at one gallon, for illustration, and then, if I desire to draw a gallon, I place the measure or it stands permanently located upon an oil-tank, and then pump the liquid into the measure until it overflows through the tube 4, the overflow passing down through the tube back into the tank again. Then opening the faucet I draw off the contents; or if the measure is set at a gallon and contains a gallon of liquid and I desire to draw two quarts, I rotate the shaft and pinion and depress the gage, pushing the tube down through the stuffing-box until the gage indicates two quarts, and as fast as the tube is forced downward the liquid will flow out of the measure down through the tube into the tank, and will leave in the measure the two quarts desired.

From this it will be observed that the measure can be varied in capacity according to the gage-marks by raising or lowering the overflow-tube 4.

What I claim is—

1. The combination, with the body A, provided with a faucet 2, and with a strap 11 across the top, of an overflow-tube 4, inserted through the bottom of the body, a rod secured to the tube 4, a gage secured upon the top of the rod and provided with a rack upon its rear face and a graduated scale upon its front face, and a pinion mounted upon a shaft journaled in ears upon the top of the body, and means for rotating the pinion, as set forth.

2. The combination, with the body A, provided with a faucet 2, and with a strap 11 across the top, of an overflow-tube 4, inserted through the bottom of the body, a rod secured to the tube 4, a gage secured upon the top of the rod and provided with a rack upon its rear face and a graduated scale upon its front face, and engaging with a guide-slot in the strap 11, and a pinion mounted upon a shaft journaled in ears upon the top of the body, and means for rotating the pinion, as set forth.

In witness whereof I have hereunto set my hand this 2d day of February, 1889.

DAVID BOTHWELL.

In presence of—
C. W. SMITH,
H. P. DENISON.